No. 12,094. REISSUED MAR. 10, 1903.
J. KLEIN.
SUCTION VALVE FOR PUMPS.
APPLICATION FILED AUG. 22, 1902.
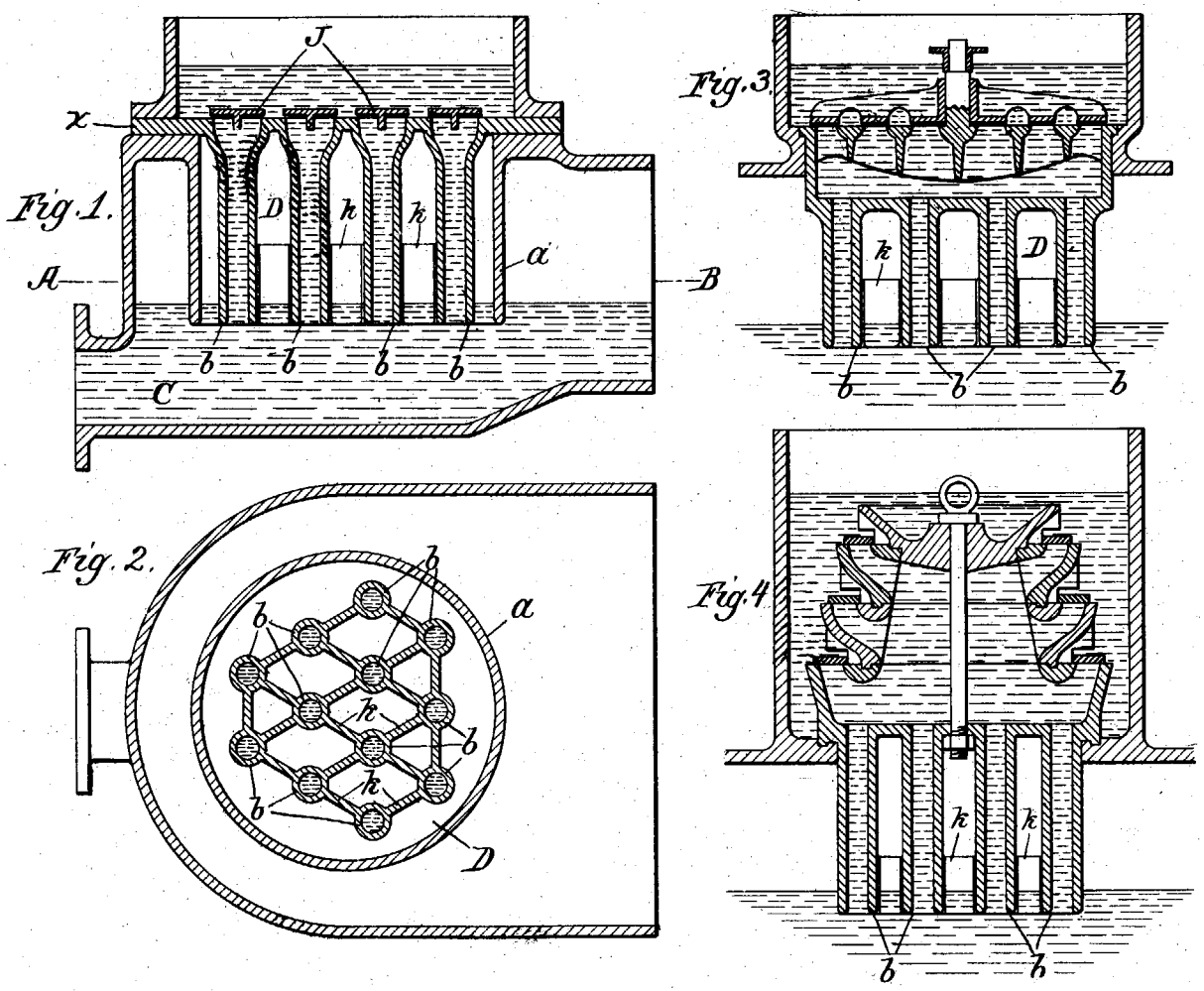
Witnesses.
Edward T. Wray
Homer L. Kloff
Inventor.
Johann Klein.
by Parker Carter
Attorneys

UNITED STATES PATENT OFFICE.

JOHANN KLEIN, OF FRANKENTHAL, GERMANY.

SUCTION-VALVE FOR PUMPS.

SPECIFICATION forming part of Reissued Letters Patent No. 12,094, dated March 10, 1903.

Original No. 681,233, dated August 27, 1901. Application for reissue filed August 22, 1902. Serial No. 120,730.

*To all whom it may concern:*

Be it known that I, JOHANN KLEIN, a subject of the King of Bavaria, residing at Frankenthal, Palatinate, Germany, have invented certain new and useful Improvements in Suction-Valves for Pumps, of which the following is a full, clear, and exact specification.

This invention relates to suction-valves for pumps provided with sets or groups of valves or annular or step valves; and it has for its purpose to attain a very great speed of the pump.

It also relates to means for preventing water-hammering, the introduction of large air-bubbles into the valve, the breakage or interruption of the moving column of water, and to the production of a relatively large air-space in close proximity to and about the valve-opening and of such a nature as that the air-chamber so formed will receive the large bubbles in the water and will serve as an equalizing-pressure chamber.

One of the most important conditions for a silent working of a pump consists in preventing the interruption of the water column whereby water-hammer is produced. For this purpose the mass or volume of water to be accelerated should be as small as possible. In order to attain the same purpose, the suction air-chamber is arranged as close as possible to the suction-valves, and it is proposed to give the lower part of the body of the pump the form of a suction air-chamber. By this means, owing to the slight difference between the level of the suction-valves and the water-level in the suction air-chamber, the pressure required to accelerate the flow of water is materially reduced. Pumps provided with group, annular, or step valves have, however, the disadvantage that there exists a very great difference between the area of the cross-section of the suction-pipe extending into the suction-chamber and the cross-section of the passage of the suction-valves. Owing to the great variations of speed resulting therefrom in such pumps, the number of strokes cannot be increased beyond a determined limit.

This invention relates to the arrangement of a suction-valve wherein by a suitable construction of the valve-seat the obstacles in the movement above mentioned are avoided and which, moreover, offers several other advantages as compared with the hitherto-known arrangements by which a silent exact working of the pump is insured and a much higher speed attained; and this invention further relates to the arrangement of the parts, so that the water will be led toward the valve or valve-seat in relatively small and long tubes, which will not permit the column of water to break, which are widened or open into an enlarged chamber near the valve, and which are arranged so as to produce a practicable pressure-equalizing air-space about the tubes and valve-seat.

The accompanying drawings show several forms of construction of this suction-valve.

Figure 1 is a vertical section through the lower part of the pump, showing the form of construction for group-valves. Fig. 2 is a horizontal section on line A B in Fig. 1. Fig. 3 is a similar section as Fig. 1 through a pump-body with annular valves. Fig. 4 shows a corresponding section through a pump-body with a three-step valve.

All these constructions have in common the arrangement of tubes *b*, which extend downward from underneath the valve-seats and dip into the water in the lower part of the suction-chamber C, thereby constituting in the upper part of this chamber, between the tubes themselves and between the latter and the adjacent walls of the pump-body, a free air space or chamber D as close to the suction-valves as is possible. In addition to these tubes *b* a cylinder *a* may be employed, which surrounds the whole series of tubes *b* and forms the outer wall of the air-chamber in the pump-body. In the construction shown in Figs. 1 and 2 the tubes *b* are formed in one piece with a diaphragm *x*, and at their upper ends they are fitted with valves J of ordinary known construction. In this instance to prevent throttling of the water by the valves the upper parts of the tubes are flared or coned, as shown. The several tubes *b* may also be connected by strengthening-webs *k k*. In annular and step valves, Figs. 3 and 4, there are also arranged below the several parts of the valve tubes *b*, leading the water directly to the valve. In all these cases the water is subdivided by the small tubes *b* below each section of the valve, and variations of speed in the passage from the suction-chamber into the pump-chamber are avoided. The spaces between the valves in the old construction offer a resistance to the flow of the water; but in the new construction each space between the tubes *b* constitutes an air vessel, the pressure in which assists the movement of the water.

The water is led to the several parts of the valve in a number of straight parallel streams, the axis of each of which is the shortest path from the suction-chamber to the pump-chamber, and as the direction of each stream is normal to the valve there is no tendency of the valve to tilt or bind. Each of the streams being inclosed and isolated, the production of eddies and counter-currents is reduced to a minimum on the suction side, while at the same time the volume of liquid to be accelerated at every stroke of the piston is reduced to a minimum, and the rate of flow is made more uniform, so that at no one point is the velocity relatively greater than at any other point. If through the suction-conduit air-bubbles enter, they do not penetrate suddenly into the pump-chamber between the suction and forcing valve, but they are distributed and enter only slowly into the pump-chamber, so that the frequently-occurring shocks are avoided.

The use and operation of my invention are as follows: The water-chamber in the lower part of the pump is arranged so that the normal level of the water leaves a considerable air-chamber above such water-level and beneath the valve or valves, and thus at all times during the action of the pump there is a considerable air-chamber at this point. As the water rushes into this suction-chamber, the lower ends of the tubes being relatively small and the space about them relatively large, there is a tendency of the water to compress the air in these spaces or in this space and of the compressed air to react and assist in regulating and maintaining the columns of water moving through the tubes. Large bubbles in the moving water, which might be under other conditions carried up to the valves, tend to pass into these large air-spaces, and when in the continued action of the pump it becomes necessary for such air to pass up through the valve the air will be fed in small bubbles out of the air-chamber into the moving columns of water. These tubes are enlarged at the top, as indicated in Fig. 1, or open into enlargements, as indicated in Figs. 3 and 4, and thus the throttling of the water by the valves at this point is prevented. The tube or tubes present a total cross-section of moving water equal to the valve opening or openings associated with such tube or tubes. By this arrangement of the tube or tubes with reference to the valve or valves I avoid the injurious friction created by the valve itself which exists when the cross-section of the tube is equal to the cross-section of the valve and its free passage-way. In other words, by this construction the mass of water moving a certain distance through the tube in a given length of time is approximately equal to the mass of water carried through the free valve-opening during the same period. To accomplish this result, it is obvious that the relatively contracted passage-way of the tube must be enlarged at or near the point where it delivers water to or toward the valve-opening, and hence I have widened the tubes at the top or caused them to open into the chamber just below the valve. By this construction I am able to use relatively long tubes, thus increasing the size of the air-space about them and thus producing an air-space of sufficient magnitude to act as an equalizer and a receiver and distributer of the bubbles of air moving along with the current of water.

I claim—

1. The combination with the valve, of a plurality of separated tubes leading thereto and serving to divide the water passing to the valve into a number of small streams, the space between the tubes constituting an air-chamber adjacent to the valve, substantially as described.

2. The combination with the valve-seat provided with a plurality of valve-controlled passages, of a plurality of separated tubes leading to said passages and serving to divide the water passing thereto into a number of isolated parallel streams, and a cylinder surrounding said tubes and constituting the outer wall of an air-chamber formed by the spaces between the tubes, substantially as described.

3. The combination with the valve, of a plurality of separated tubes leading thereto and serving to divide the water passing to the valve into a number of small streams, the space between the tubes constituting an air-chamber adjacent to the valve, the cross-section of the separated tubes approximately equal to the cross-section of the free opening of the valve, substantially as described.

4. The combination with the valve-seat provided with a plurality of valve-controlled passages, of a plurality of separated tubes leading to said passages and serving to divide the water passing thereto into a number of isolated parallel streams, and a cylinder surrounding said tubes and constituting the outer wall of an air-chamber formed by the spaces between the tubes, the cross-section of the separated tubes approximately equal to the cross-section of the free opening of the valve, substantially as described.

5. The combination with the valve, of a plurality of separated tubes leading thereto and serving to divide the water passing to the valve into a number of small streams, the space between the tubes constituting an air-chamber adjacent to the valve, and an enlarged chamber between the upper opening of the tube proper and the valve-opening, substantially as described.

6. The combination with the valve-seat provided with a plurality of valve-controlled passages, of a plurality of separated tubes leading to said passages and serving to divide the water passing thereto into a number of isolated parallel streams, a cylinder surrounding said tubes and constituting the outer wall of an air-chamber formed by the spaces between the tubes, and an enlarged chamber between the upper opening of the tube proper and the valve-opening, substantially as described.

7. The combination with the valve, of a plurality of separated tubes, relatively long and projecting down into the suction-chamber so as to leave a considerable space in such chamber above the normal water-line therein and leading to the valve and serving to divide the water passing to the valve into a number of small streams, the space between the tubes constituting an air-chamber adjacent to the valve, substantially as described.

8. The combination with the valve-seat provided with a plurality of valve-controlled passages, of a plurality of separated tubes, relatively long and projecting down into the suction-chamber so as to leave a considerable space in such chamber above the normal water-line therein and leading to said passages and serving to divide the water passing thereto into a number of isolated parallel streams, and a cylinder surrounding said tubes and constituting the outer wall of an air-chamber formed by the spaces between the tubes, substantially as described.

9. A pump, comprising a suction-chamber, having an effective valve-opening leading therefrom, and an extended waterway leading from one part of the suction-chamber to the valve-opening, the total cross-section of such waterway being approximately equal to such valve-opening when the valve is raised.

10. A pump, comprising a suction-chamber, having an effective valve-opening leading therefrom, an extended waterway leading from one part of the suction-chamber to the free valve-opening, the total cross-section of such waterway being approximately equal to such valve-opening when the valve is raised, and an enlargement between the valve and the end of the waterway.

JOHANN KLEIN.

Witnesses:
JACOB ADRIAN,
H. W. HARRIS.